US008490076B2

(12) United States Patent
Wolf et al.

(10) Patent No.: US 8,490,076 B2
(45) Date of Patent: Jul. 16, 2013

(54) SYSTEM AND METHOD FOR COLLECTING INSTALLED SOFTWARE APPLICATION DATA

(75) Inventors: Michael Wolf, Paderborn (DE); Matthias Roth, Bad Lippspringe (DE); Gerhard Scholand, Paderborn (DE); Achim Recksiek, Soest (DE)

(73) Assignee: CA, Inc., Islandia, NY (US)

( * ) Notice: Subject to any disclaimer, the term of this patent is extended or adjusted under 35 U.S.C. 154(b) by 1175 days.

(21) Appl. No.: 11/770,393

(22) Filed: Jun. 28, 2007

(65) Prior Publication Data
US 2009/0006307 A1  Jan. 1, 2009

(51) Int. Cl.
*G06F 9/44* (2006.01)

(52) U.S. Cl.
USPC .......................................... 717/170

(58) Field of Classification Search
USPC .......................................... 717/170
See application file for complete search history.

(56) References Cited

U.S. PATENT DOCUMENTS

| | | | | |
|---|---|---|---|---|
| 6,324,581 B1* | 11/2001 | Xu et al. | | 709/229 |
| 6,381,742 B2* | 4/2002 | Forbes et al. | | 717/176 |
| 6,918,113 B2* | 7/2005 | Patel et al. | | 717/178 |
| 7,162,628 B2* | 1/2007 | Gentil et al. | | 717/174 |
| 7,386,839 B1* | 6/2008 | Golender et al. | | 717/170 |
| 7,395,131 B2* | 7/2008 | Funk | | 700/108 |
| 7,571,437 B2* | 8/2009 | Tanno et al. | | 717/172 |
| 8,103,878 B2* | 1/2012 | Kawamae | | 717/168 |
| 8,306,991 B2* | 11/2012 | Borthakur et al. | | 707/760 |
| 2002/0147974 A1* | 10/2002 | Wookey | | 717/176 |
| 2005/0273779 A1* | 12/2005 | Cheng et al. | | 717/174 |
| 2007/0180446 A1* | 8/2007 | Sirota et al. | | 717/174 |
| 2008/0140960 A1* | 6/2008 | Basler et al. | | 711/162 |
| 2008/0244534 A1* | 10/2008 | Golender et al. | | 717/128 |

OTHER PUBLICATIONS

Deng et al., "An application of the Internet-based project management system", elsevier Science, 2001.*
Fu et al., "Fast and Secure distributed read-only-file system", ACM, Feb. 2002.*
Amini, "SPC: A Distributed, Scalable Platform for Data Mining", ACM, Aug. 20, 2006.*

* cited by examiner

*Primary Examiner* — Anna Deng
*Assistant Examiner* — Junchun Wu
(74) *Attorney, Agent, or Firm* — Baker Botts, LLP

(57) ABSTRACT

A method and system for collecting installed application data from a computer system. The method includes scanning a file system of the computer system to produce file system data, and scanning an installed application database of the computer system to produce installed application data. The method further includes collecting system information associated with the computer system. The method still further includes combining the file system data, the application data, and the system information to produce an output file.

32 Claims, 2 Drawing Sheets

SYSTEM AND METHOD FOR COLLECTING INSTALLED SOFTWARE APPLICATION DATA

TECHNICAL FIELD

The present disclosure relates in general to software inventory, and more particularly, to a system and method for collecting installed software application data.

BACKGROUND

The quality of software inventory depends directly on the quality of the underlying application signatures associated with software applications. Therefore, engineering application signatures is an important task. Also, it is a very difficult task, as there are hundreds and thousands of applications in the field. Furthermore, application signatures change significantly between different versions of an application and between the same applications being installed on different operating system platforms.

In the past, a method of engineering an application signature for an application on a certain operating system platform was to install the application on that platform and to analyze what has been changed by the installation process. Such a method requires that a license for the applications is available. In addition, the respective operating system platform is needed in order to carry out the analysis. As a result, the engineering of software application signatures is extremely costly and time consuming.

SUMMARY

According to a particular embodiment of the present invention, a method for collecting installed application data from a computer system includes scanning a file system of the computer system to produce file system data, and scanning an installed application database of the computer system to produce installed application data. The method further includes collecting system information associated with the computer system. The method still further includes combining the file system data, the application data, and the system information to produce an output file.

According to another embodiment of the present invention, a system for a computer system includes a processor, and a program storage device readable by the processor, embodying computer executable code. The processor is operable when executing the code to scan a file system of a computer system to produce file system data, scan an installed application database of the computer system to produce installed application data, collect system information associated with the computer system, and combine the file system data, the application data, and the system information to produce an output file.

According to still another embodiment of the present invention, a system for collecting installed application data includes means for scanning a file system of a computer system to produce file system data, means for scanning an installed application database of the computer system to produce installed application data, and means for collecting system information associated with the computer system. The system further includes means for combining the file system data, the application data, and the system information to produce an output file.

A technical advantage of certain embodiments of the present invention is the ability to scan a computer for any data which is associated with installed software applications. Another technical advantage of certain embodiments of the present invention includes the ability to collect the appropriate data for any arbitrary software application independently of how the application has been installed. Another technical advantage of certain embodiments of the invention, is that there is no longer the need for software engineers to have a license available for the application on the required platform, install the application, and analyze what has been changed on the system. Another advantage of certain embodiments of the present invention is that it makes signature development less costly and less time consuming.

Other technical advantages of certain embodiments of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
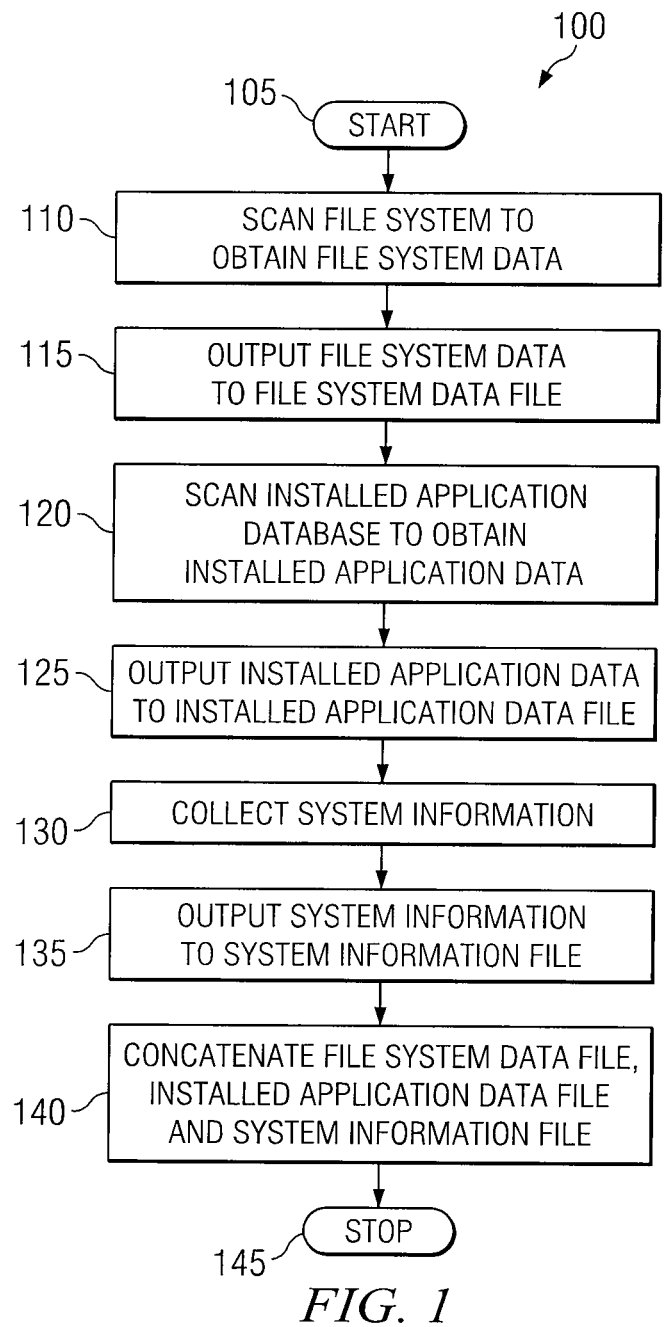
FIG. 1 is a simplified flow chart illustrating a procedure for collecting data associated with software applications that have been installed on a computer system according to an embodiment of the present invention.

In describing the present invention illustrated in the drawings, specific terminology is employed for sake of clarity. However, the present disclosure is not intended to be limited to the specific terminology so selected.

FIG. 1 is a simplified flowchart illustrating a procedure 100 for collecting data associated with software applications that have been installed on a computer system according to an embodiment of the present invention. The procedure 100 starts at a step 105. In a step 110, a file system of the computer system for which data is to be collected is scanned to obtain file system data. During the scanning of the file system, an enumeration or list of all files and folders, together with the associated file system properties, of the file system is created as part of the file system data. Examples of file system properties that are collected include, but are not limited to, file name, file size, date information (e.g., created data, last modified date), and version information. In a step 115, the file system data is output as a file system data file. In accordance with various embodiments of the invention, the file system data file is written to a data storage device, such as a hard drive, associated with the computer system. In accordance with various embodiments of the invention, the file system data file is formatted as an Extensible Markup Language (XML) file. In other embodiments, the file system data file may be formatted in any suitable format.

In a step 120, an installed application database of the computer system is scanned to obtain installed application data. In accordance with various embodiments of the present invention, the installed application database is a registry, such as the registry used in a Microsoft Windows™ operating system.

In accordance with other embodiments of the invention, the installed application database includes installed package information such as that provided by the RPM Package Manager used in a Linux operating system. The installed application database includes information about the software applications installed on the computer system. Examples of the information found in the installed application database include, but are not limited to, application software names, application configuration data, and application version information. In a step 125, the installed application data is output as an installed application data file. In accordance with various embodiments of the invention, the installed application data file is written to the data storage device. In accordance with various embodiments of the invention, the installed application data is formatted as an XML file. In other embodiments, the installed application data file may be formatted in any suitable format.

In a step 130, system information associated with the computer system is collected. The system information includes information such as a host name, an IP address, a MAC address, vendor information, and a serial number of the computer system. In a step 135, the system information is output as a system information file. In accordance with various embodiments of the invention, the system information file is written to the data storage device. In accordance with various embodiments of the invention, the system information file is formatted as an XML file. In other embodiments, the system information file may be formatted in any suitable format.

In a step 140, the file system data file, the installed application data file, and the system information file are combined into a single output file, such as by concatenating the file system data file, the installed application data file, and the system information file. In accordance with various embodiments of the invention, the single output file is written to the data storage device. The single output file contains information to facilitate the creation of one or more application signatures by a software engineer. In accordance with various embodiments of the invention, the output file is formatted as an XML file. In other embodiments, the single output file may be formatted in any suitable format. In various embodiments, the single output file is formatted to allow effective navigation to individual items in the single output file by a user. An example format for the single output file that may be used in other embodiments is the Microsoft Windows™ "ini" format. In a step 145, the procedure 100 ends.

After the single output file is generated, the single output file can be viewed by one or more software engineers to allow the software engineer to create a meaningful application signature for one or more software applications. In addition to other uses, application signatures allow for improved software inventory so that it can be known which software applications have been installed on a computer. A number of procedures may be used by the software engineer to create the application signatures from the information contained in the output file. Such procedures are well known to those skilled in the art of developing application signatures.

Figure 2:
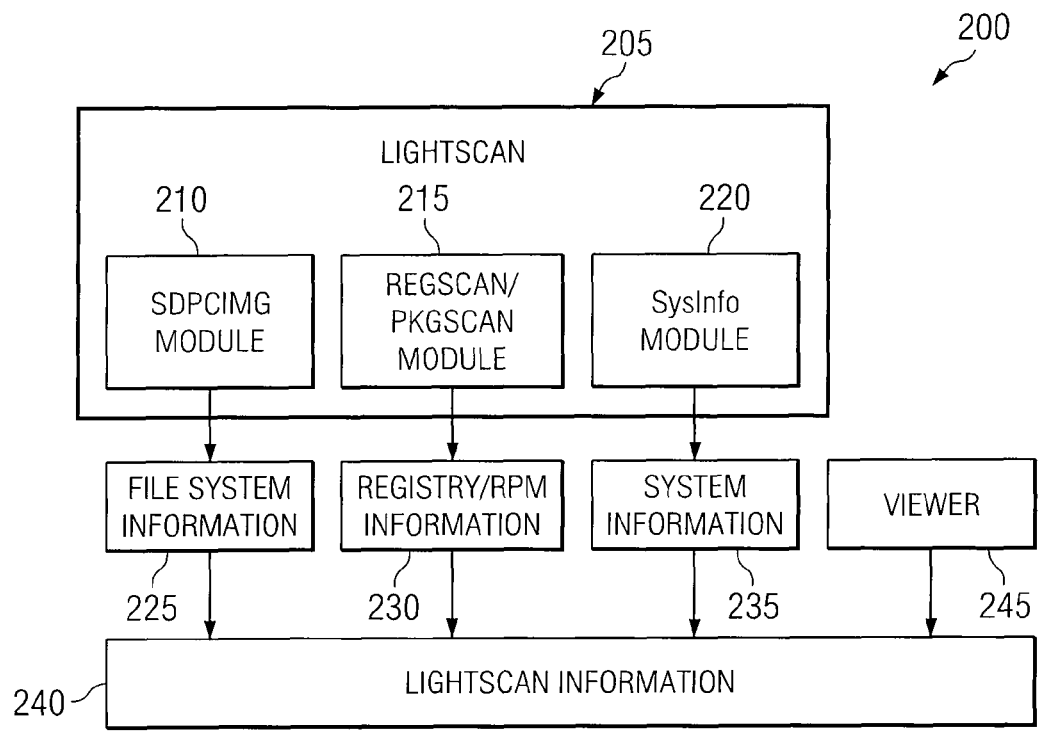
FIG. 2 is a simplified block diagram illustrating a software utility according to the embodiment of the present invention.

FIG. 2 is a simplified block diagram illustrating a software utility 200 according to the embodiment of the present invention. In accordance with the particular embodiment illustrated in FIG. 2, the software utility 200 comprises the LightScan software tool 205. The LightScan software tool 205 is executed from a local computer system for which one or more application signatures is to be generated. In accordance with various embodiments of the present invention, the LightScan software tool 205 is a command line tool that is executed on the local computer to gather data related to installed applications from the local computer, and write the data to an output file in XML format. In accordance with the embodiment illustrated in FIG. 2, the LightScan software tool 205 may be executed on a local computer operating under either a Microsoft Windows™ operating system, or a Linux operating system.

An example command syntax for an embodiment of the LightScan software tool 205 used in a Microsoft Windows™ or Linux environment is as follows:

| lightscan [-s <folder>] [-o <output file>] [-r <registry key>] | |
|---|---|
| -s <folder> | Starting point of file system scan |
| | Default on Windows: Operating System disk, e.g. C:\ |
| | Default on Linux: / (root directory) |
| -o <output file>] | Output file |
| -r <registry key> | Starting point of the registry scan |
| | Default on Windows: HKLM\Software |
| | -r is not applicable for Linux. |

An example execution of the LightScan software tool 205 for a Microsoft Windows™ operating system is as follows:

```
lightscan -s c:\dell -o c:\out.xml -r
SOFTWARE\\Microsoft\\Windows\\CurrentVersion\\Uninstall
```

This collects system information from the computer and scans all directories and files starting in directory c:\dell.

In addition it dumps all registry entries and subentries starting with
HKLM\SOFTWARE\Microsoft\Windows\Current Version\Uninstall Data is written to output file c:\out.xml An example execution of the LightScan software tool 205 for a Linux operating system is as follows:

Lightscan -s /usr/lib -o /tmp/out.xml

This collects system information from the computer and scans all directories and files starting in directory /usr/lib. In addition, it collects information from the RPM Package Manager.

Data is written to output file /tmp/out.xml

The LightScan software tool 205 includes a sdpcimg module 210, a RegScan/PkgScan module 215, and SysInfo module 220. In accordance with various embodiments of the invention, the sdpcimg module 210, the RegScan/PkgScan module 215, and the SysInfo module 220 are embodied as separate executables that are called by the LightScan software tool 205. In still other embodiments, the sdpcimg module 210, the RegScan/PkgScan module 215, and the SysInfo module 220 are embodied within the LightScan software tool 205.

The sdpcimg module 210 scans the file system of the local computer system and creates a list of files and folder together with the file properties such as file size, dates, and version information. The sdpcimg module 210 further outputs the file system information as a temporary file system information XML file 225. In accordance with various embodiments of the invention, the sdpcimg module 210 performs the functions in Step 110 and Step 115 of the embodiment illustrated in FIG. 1.

An example output of the sdpcimg module 210 within a Microsoft Windows™ operating system is as follows:

```
    <scan name="C:\Dell\SBSIXPPR\FLASH.EXE">
        <name="SpecialBuild" value=""/>
        <name="PrivateBuild" value=""/>
        <name="ProductVersion" value="4.71.0410.0"/>
        <name="ProductName" value="Microsoft; Windows NT40;R41;
Operating System"/>
        <name="OriginalFilename" value="WEXTRACT.EXE    "/>
        <name="LegalTrademarks" value=""/>
        <name="LegalCopyright" value="Copyright 40;C41;
Microsoft Corp. 1995"/>
        <name="InternalName" value="Wextract           "/>
        <name="FileVersion" value="4.71.0410.0"/>
        <name="FileDescription" value="Win32 Cabinet Self-
Extractor"/>
        <name="CompanyName" value="Microsoft Corporation"/>
        <name="Comments" value=""/>
    </scan>
```

The RegScan/PkgScan module 215 scans an installed application database of the computer system to obtain installed application data. In a Microsoft Windows™ operating system, the RegScan/PkgScan module 215 exports all registry entries and subentries starting at a given path, and writes the output to a temporary Registry/RPM information XML file 230. In accordance with various embodiments of the invention, the RegScan/PkgScan module 215 performs the functions in Step 120 and Step 125 of the embodiment illustrated in FIG. 1.

Following is an example of an XML file created by Reg-Scan:

```
    <reg_key name="KB873333">
        <reg_value name="DisplayName" value="Windows XP Hotfix
- KB873333"/>
        <reg_value name="DisplayVersion"
value="20050114.005213"/>
        <reg_value name="HelpLink"
value="http://support.microsoft.com?kbid=873333"/>
        <reg_value name="NoModify" value="binary"
type="REG_DWORD"/>
        <reg_value name="NoRepair" value="binary"
type="REG_DWORD"/>
        <reg_value name="ParentDisplayName" value="Windows XP -
Software Updates"/>
        <reg_value name="ParentKeyName"
value="OperatingSystem"/>
        <reg_value name="Publisher" value="Microsoft
Corporation"/>
        <reg_value name="TSAware" value="binary"
type="REG_DWORD"/>
        <reg_value name="UninstallString"
value="C:\WINDOWS\$NtUninstallKB873333$\spuninst\spuninst.exe"/>
        <reg_value name="URLInfoAbout"
value="http://support.microsoft.com"/>
    </reg_key>
```

In a Linux operating system, RegScan/PkgScan module 215 exports a list of all installed RPM packages, and writes the output to a temporary Registry/RPM information XML file 230.

The SysInfo module 220 collects system information associated with the local computer system. The system information includes, but is not limited to, information such as a host name, an IP address, a MAC address, vendor information, and a serial number of the computer system. The system information is output as a temporary system information XML file 235. In accordance with various embodiments of the invention, the SysInfo module 220 performs the functions in Step 130 and Step 135 of the embodiment illustrated in FIG. 1.

An example output of the SysInfo module 220 is as follows:

```
    <common_asset_report><vendor>Dell</vendor>
        <serial_number>N/A</serial_number>
        <asset_tag>N/A</asset_tag>
        <host_name>testmachine_1</host_name>
        <host_uuid>B4540CB2-FB88-4452-9173-
3622AB2B41EA</host_uuid>
        <mac_address>00:0F:1F:70:8A:AA</mac_address>
        <ip_address>123.234.345.456</ip_address>
        <subnet_mask>255.255.255.0</subnet_mask>
        <dns_name>testmachine_1</dns_name>
```

The LightScan software tool 205 further concatenates the temporary file system information XML file 225, the temporary Registry/RPM information XML file 230, and the temporary system information XML file 235 into a single LightScan information output XML file 240. In accordance with various embodiments of the invention, the LightScan software tool 205 performs this function in Step 140 of the embodiment illustrated in FIG. 1.

In accordance with various embodiments, the LightScan information output XML file 240 can be viewed by one or more software engineers using a viewer 245 to display the LightScan information output XML file 240. The viewer 245 presents the information collected in the one LightScan information output XML file 240 in a comfortable way to allow the software engineer to create a meaningful application signature for one or more software applications. In accordance with various embodiments, the viewer 245 is a Java-based application. In accordance with various embodiments, the viewer 245 is executed on the local computer system. In still other embodiments, the LightScan information output XML file 240 can be stored on a storage medium or transmitted via a network to allow the LightScan information output XML file 240 to be viewed using a viewer 245 executed on another computer.

An example of a LightScan information output XML file 240 from a computer in which the Macromedia Dreamweaver MX software application has been installed is as follows:

```
<reg_key
name="SOFTWARE\Microsoft\Windows\CurrentVersion\Uninstall\
{81CBD4E0-F68A-46F8-AE76-773BEFB79B81}\">
    <reg_value name="AuthorizedCDFPrefix" value=""/>
    <reg_value name="Comments" value="">
    <reg_value name="Contact" value=""/>
    <reg_value name="DisplayVersion" value="6.0"/>
    <reg_value name="HelpLink" value=""/>
    <reg_value name="HelpTelephone" value=""/>
    <reg_value name="InstallDate" value="20070405"/>
    <reg_value name="InstallLocation" value=""/>
    <reg_value name="InstallSource"
value="\\NHQ1ACCOSS06UNI\MSILIB\ba8dd5\"/>
    <reg_value name="ModifyPath" value="MsiExec.exe /I{81CBD4E0-
F68A-46F8-AE76-773BEFB79B81}" type="REG_EXPAND_SZ"/>
    <reg_value name="Publisher" value="American Family
Insurance"/>
    <reg_value name="Readme" value=""/>
    <reg_value name="Size" value=""/>
    <reg_value name="EstimatedSize" value="0x0001b47d (111741)"
type="REG_DWORD"/>
    <reg_value name="UninstallString"
value="MsiExec.exe/I{81CBD4E0-F68A-46F8-AE76-773BEFB79B81}"
type="REG_EXPAND_SZ"/>
    <reg_value name="URLInfoAbout" value=""/>
    <reg_value name="URLUpdateInfo" value=""/>
    <reg_value name="VersionMajor" value="0x00000006 (6)"
```

```
type="REG_DWORD"/>
<reg_value name="VersionMinor" value="0x00000000 (0)"
type="REG_DWORD"/>
<reg_value name="WindowsInstaller" value="0x00000001 (1)"
type="REG_DWORD"/>
<reg_value name="Version" value="0x06000000 (100663296)"
type="REG_DWORD"/>
<reg_value name="Language" value="0x00000409 (1033)"
type="REG_DWORD"/>
<reg_value name="DisplayName" value="Macromedia Dreamweaver
MX"/>
</reg_key>
<file name="\Macromedia\Dreamweaver
MX\Dreamweaver.exe">
<file_attr_value name="size" value="9797632" />
<file_attr_value name="Created" value="Wed May 22 00:13:20
2002" />
<file_attr_value name="Accessed" value="Thu Apr 05
15:37:07 2007" />
<file_attr_value name="Modified"
value="Wed May 22 00:13:20 2002" />
<file_attr_value name="Language" value="English
(United States) - Unicode"/>
<file_attr_value name="ProductVersionHead"
value="6.0.1722.0"/>
<file_attr_value name="FileVersionHead" value="6.0.1722.0"/>
<file_attr_value name="SpecialBuild" value=""/>
<file_attr_value name="PrivateBuild" value=""/>
<file_attr_value name="ProductVersion" value="6.0.1722"/>
<file_attr_value name="ProductName" value="Macromedia
Dreamweaver MX"/>
<file_attr_value name="OriginalFilename"
value="Dreamweaver.exe"/>
<file_attr_value name="LegalTrademarks" value="Dreamweaver
MX is a trademark of Macromedia."/>
<file_attr_value name="LegalCopyright" value="Copyright
(c) 2002 Macromedia, Inc."/>
<file_attr_value name="InternalName" value="Dreamweaver
MX"/>
<file_attr_value name="FileVersion" value="6.0"/>
<file_attr_value name="FileDescription" value="Dreamweaver
MX"/>
<file_attr_value name="CompanyName" value="Macromedia,
Inc."/>
<file_attr_value name="Comments" value="what the web can
be"/>
</file>
```

An example application signature for the Macromedia Dreamweaver MX software application created from the example Lightscan information output XML file 240 is as follows:

```
<group type="and">
<package name="Macromedia Dreamweaver MX" version="6.0" />
<file name="Dreamweaver.exe" minversion="6.0.1722.0"
maxversion="6.0" path="*" />
</group>
```

The following line of the above listed example application signature:

<package name="Macromedia Dreamweaver MX" version="6.0"/> is created from the following lines of the example Lightscan information output XML file 240:

```
<reg_value name="DisplayVersion" value="6.0"/>
<reg_value name="DisplayName" value="Macromedia Dreamweaver
MX"/>
```

The following line of the above listed example application signature:

```
"<file name="Dreamweaver.exe" minversion="6.0.1722.0"
maxversion="6.0" path="*" />"
``` is created from the following lines of the example Lightscan information output XML file 240:

```
<file name="\Macromedia\Dreamweaver
MX\Dreamweaver.exe">
<file_attr_value name="FileVersionHead" value="6.0.1722.0"/>
```

Figure 3:
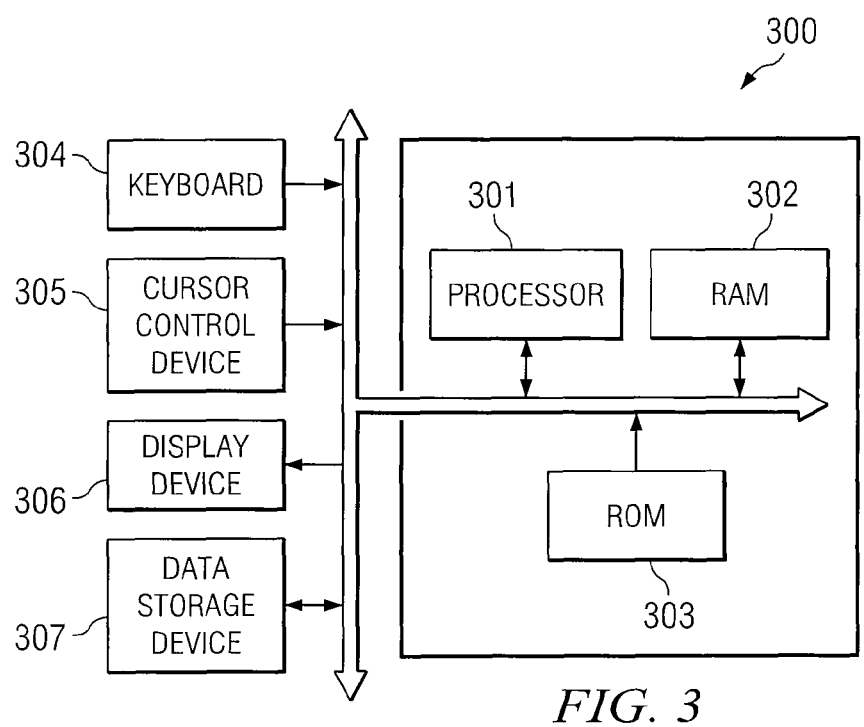
FIG. 3 is a simplified block diagram of a computer system which may implement the method and system of the present disclosure.

FIG. 3 is a simplified block diagram of a computer system which may implement the method and system of the present disclosure. The system and method of the present disclosure may be implemented in the form of a software application running on a computer system, for example, a mainframe, personal computer (PC), handheld computer, server, etc. The software application may be stored on recording media locally accessible by the computer system and/or accessible via a hard wired or wireless connection to a network, for example, a local area network, or the Internet.

The computer system referred to generally as system 300 may include, for example, a processor 301, random access memory (RAM) 302, a read only memory (ROM) 303, a keyboard 304, a cursor control device 305, and a display device 306. As shown, the system 300 may be connected to a data storage device 307, for example, a hard disk. The process as described in the present disclosure may be adapted as computer-executable instructions stored on a computer-readable media, e.g., data storage device 307 such as a hard drive, magnetic media, optical media, etc., or in read only memory (ROM) 303 of the computer system 300.

The computer-executable instructions may be loaded from the data storage device 307 to RAM 302 from which the processor 301 reads and executes each instruction, or the processor may access and execute the instructions directly from ROM 303 depending on the manner in which the instructions are stored. Additionally, the data storage device 307 can be used to store the temporary and output XML files produced by the process as described above.

Various embodiments of the present invention provide for the ability to scan a computer for any data which is associated with installed software applications. Various embodiments of the present invention further include the ability to collect the appropriate data for any arbitrary software application independently of how the application has been installed. In accordance with various embodiments of the invention, software engineers can analyze the collected data in order to develop an application signature for a particular application on a particular platform.

Although the above specific embodiments have been described with respect to computer systems which operate under a Microsoft Windows™ or Linux operating system, it should be understood that in other embodiments of the invention, the principles described herein can be applied to any operating system. For example, in other embodiments of the invention the principles described herein can be applied to computer systems which operate under a Unix operating system, like Solaris, AIX, or HP-UX.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for collecting installed application data from a computer system, comprising:
   scanning a file system of the computer system to produce file system data;
   scanning an installed application database of the computer system to produce installed application data;
   collecting system information comprising at least one of a host name, an IP address, a MAC address, and a serial number associated with the computer system;
   combining, using a processor, the file system data, the application data, and the system information to produce an output file, wherein the combining of the file system data, the application data, and the system information comprises concatenating the file system data, the application data, and the system information;
   writing the file system data to a file system section in the output file, the file system section identified by a first identifier;
   writing the application data to an application data section in the output file, the application data section identified by a second identifier;
   writing the system information to a system information section in the output file, the system information section identified by a third identifier; and
   using the output file to facilitate creation of at least one application signature associated with a software application, wherein creation of the at least one application signature does not require execution of the software application and wherein the at least one application signature is derived from information from at least two of the file system data, the application data, and the system information.

2. The method of claim 1, wherein the file system data includes an enumeration of files and associated file properties.

3. The method of claim 2, wherein the file properties include at least one of a file name, a file size, date information, and version information.

4. The method of claim 1, wherein the installed application database comprises a registry.

5. The method of claim 1, wherein the installed application database comprises a package manager database.

6. The method of claim 1, wherein the installed application database includes at least one of an application software name, application configuration data, and application version information.

7. The method of claim 1, further comprising storing the file system data on a storage device.

8. The method of claim 1, further comprising storing the installed application data on a storage device.

9. The method of claim 1, further comprising storing the system information on a storage device.

10. The method of claim 1, further comprising storing the output file on a storage device.

11. The method of claim 1, wherein the output file comprises an XML file.

12. The method of claim 1, further comprising displaying the output file.

13. A computer system comprising:
    a processor; and
    a program storage device readable by the processor, embodying computer executable code, the processor operable when executing the code to:
    scan a file system of a computer system to produce file system data;
    scan an installed application database of the computer system to produce installed application data;
    collect system information comprising at least one of a host name, an IP address, a MAC address, and a serial number associated with the computer system;
    combine the file system data, the application data, and the system information to produce an output file, wherein the combining of the file system data, the application data, and the system information comprises concatenating the file system data, the application data, and the system information;
    writing the file system data to a file system section in the output file, the file system section identified by a first identifier;
    writing the application data to an application data section in the output file, the application data section identified by a second identifier;
    writing the system information to a system information section in the output file, the system information section identified by a third identifier; and
    use the output file to facilitate creation of at least one application signature associated with a software application, wherein creation of the at least one application signature does not require execution of the software application and wherein the at least one application signature is derived from information from at least two of the file system data, the application data, and the system information.

14. The computer system of claim 13, wherein the file system data includes an enumeration of files and associated file properties, and wherein the processor is further operable to store the file system data on a storage device.

15. The computer system of claim 14, wherein the file properties include at least one of a file name, a file size, date information, and version information.

16. The computer system of claim 13, wherein the installed application database comprises a registry, and wherein the processor is further operable to store the installed application data on a storage device.

17. The computer system of claim 13, wherein the installed application database comprises a package manager database.

18. The computer system of claim 13, wherein the installed application database includes at least one of an application software name, application configuration data, and application version information.

19. The computer system of claim 13, wherein the processor is further operable to store the system information on a storage device.

20. The computer system of claim 13, wherein the processor is further operable to store the output file on a storage device.

21. The computer system of claim 13, wherein the output file comprises an XML file.

22. The computer system of claim 13, wherein the processor is further operable to display the output file.

23. A system for collecting installed application data, comprising:
    means for scanning a file system of a computer system to produce file system data;

means for scanning an installed application database of the computer system to produce installed application data;

means for collecting system information comprising at least one of a host name, an IP address, a MAC address, and a serial number associated with the computer system; and means for combining the file system data, the application data, and the system information to produce an output file, wherein the combining of the file system data, the application data, and the system information comprises concatenating the file system data, the application data, and the system information; and means for writing the file system data to a file system section in the output file, the file system section identified by a first identifier;

means for writing the application data to an application data section in the output file, the application data section identified by a second identifier;

means for writing the system information to a system information section in the output file, the system information section identified by a third identifier; and means for using the output file to facilitate creation of at least one application signature associated with a software application, wherein creation of the at least one application signature does not require execution of the software application and wherein the at least one application signature is derived from information from at least two of the file system data, the application data, and the system information.

24. The system of claim 23, wherein the file system data includes an enumeration of files and associated file properties; and further comprising means for storing the file system data on a storage device.

25. The system of claim 24, wherein the file properties include at least one of a file name, a file size, date information, and version information.

26. The system of claim 23, wherein the installed application database comprises a registry; and further comprising means for storing the installed application data on a storage device.

27. The system of claim 23, wherein the installed application database comprises a package manager database.

28. The system of claim 23, wherein the installed application database includes at least one of an application software name, application configuration data, and application version information.

29. The system of claim 23, further comprising means for storing the system information on a storage device.

30. The system of claim 23, further comprising means for storing the output file on a storage device.

31. The system of claim 23, wherein the output file comprises an XML file.

32. The system of claim 23, further comprising means for displaying the output file.

* * * * *